US006580661B1

United States Patent
Marschall et al.

(10) Patent No.: US 6,580,661 B1
(45) Date of Patent: *Jun. 17, 2003

(54) HYDROPHONE ARRAY

(76) Inventors: Richard Anton Marschall, Suite 13, 9-11 Abel Street, Penrith, New South Wales, 2750 (AU); Debra L Marschall, Suite 13, 9-11 Abel Street, Penrith, New South Wales, 2750 (AU); Graham E Holt, 56 Riverview Road, Bolwarra Heights, New South Wales, 2320 (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,540

(22) Filed: Dec. 22, 1999

(30) Foreign Application Priority Data

Dec. 22, 1998 (AU) .............................. PP7884
Mar. 4, 1999 (AU) .............................. PP9019

(51) Int. Cl.[7] .............................................. G01V 1/38
(52) U.S. Cl. .......................... 367/154; 367/20; 367/153
(58) Field of Search ..................... 367/20, 153, 154, 367/106, 130; 174/101.5

(56) References Cited

U.S. PATENT DOCUMENTS

| 3,480,907 | A | * | 11/1969 | King | 367/20 |
| 3,713,083 | A | * | 1/1973 | Hunnicutt, Jr. | 367/106 |
| 4,092,629 | A | * | 5/1978 | Siems et al. | 367/20 |
| 4,477,887 | A | * | 10/1984 | Berni | 367/20 |
| 4,958,329 | A | * | 9/1990 | Marschall | 367/20 |
| 5,373,773 | A | * | 12/1994 | Groves | 367/106 |
| 5,837,739 | A | * | 11/1998 | Nowak et al. | 521/154 |
| 5,867,451 | A | * | 2/1999 | Chang et al. | 367/20 |
| 5,883,857 | A | * | 3/1999 | Pearce | 367/20 |
| 6,108,267 | A | * | 8/2000 | Pearce | 367/20 |

FOREIGN PATENT DOCUMENTS

DE      2751774 A1 * 5/1979

* cited by examiner

Primary Examiner—Ian J. Lobo
(74) Attorney, Agent, or Firm—Jordan and Hamburg LLP

(57) ABSTRACT

A hydrophone array including a cable, such as a towing cable, having attached thereto a plurality of housings. Each housing encloses two acoustic transducers that act as acoustic receivers and acoustic transmitters as requirements dictate during use of the array. The acoustic transducers can comprise piezoelectric transducers, including piezoelectric polymeric transducer materials. Each housing can be hydrodynamically smoothly shaped and have a first bend limiting means extending forwardly from a nose section thereof and a second bend limiting means extending rearwardly from a tail section thereof.

44 Claims, 3 Drawing Sheets

HYDROPHONE ARRAY

FIELD OF THE INVENTION

The present invention relates to a hydrophone array and, in particular, to an array for use in seismic exploration and like applications.

BACKGROUND ART

Hydrophone arrays are used to perform active and passive sound imaging. One significant application of such arrays is in the field of geophysical surveying of seabeds. Hydrophone arrays generally utilise a plurality of acoustic transducers, spaced at a controlled spacing, for providing data which cannot be readily obtained from a single hydrophone.

SUMMARY OF THE INVENTION

According to a first aspect, the present invention comprises a hydrophone array including a cable having attached thereto a plurality of housings, each housing enclosing at least two acoustic transducers.

In a preferred embodiment, each transducer has an independent output and is able, in use, to sense the same tensor component of an elastic wave in the medium surrounding the hydrophone array.

The acoustic transducers act as acoustic receivers and acoustic transmitters as requirements dictate during use of the array. In one embodiment, the acoustic transducer can comprise a tube formed at least in part of piezoelectric material. The piezoelectric material can comprise an active polarised ceramic material, such as barium titanate or lead zirconate titanate (PZT). The piezoelectric material can, in another embodiment, be a piezoelectric polymer material, such as polyvinylidene fluoride (PVDF), or a piezo-rubber composite material.

The tube comprised at least in part of piezoelectric material can be substantially cylindrical. The tube can be fabricated from two segments or a greater number of segments. The tube can be sectioned longitudinally into longitudinal segments. The inner and outer faces of the segments can each have an electrically conductive material covering at least a part of each face and thereby provide an electrode for each face. Each electrode could comprise a coating of metal, such as silver, gold or aluminium or an intrinsically or extrinsically conductive polymer. Electrical connection to the faces can be facilitated by electrically conductive leads attached to the electrodes. The attachment of the leads to the electrodes can be through use of a conductive epoxy or adhesive metallic tape.

In the case where the tube is formed of a plurality of segments, the segments are preferably arranged such that electrical connection is provided between the respective inner faces of the segments and the respective outer faces of the segments. In one embodiment, the segments may be in an abutting arrangement with short electrical leads or conductive tape providing the electrical connection between the respective faces of the segments.

In a preferred embodiment of the invention, the piezoelectric polymer film can be bonded to a tubular support structure. In a still further embodiment, the support structure can comprise at least an inner and outer tube, with the inner tube mounted within the outer tube. The tubes preferably share a common longitudinal axis. An annular space is preferably located between the inner and outer tubes and extends at least a substantial length of the tubular structure. The inner surface of the outer tube is preferably bonded to the piezoelectric polymer film. The support structure can be fabricated from polycarbonate. The outer surface of the outer tube can also be coated with a metallic layer. This metallic layer can comprise a layer of metallic paint, such as spray paint, including nickel, gold or silver conductive paints. The outer metallic coat can have at least one electrically conductive wire connected thereto which is in turn connected to a shield or drain wire in the array.

In an alternative embodiment of the invention, the acoustic transducer can include one or more capacitors which are adapted to undergo a change in capacitance that is proportional to changes in incident pressure. In another embodiment, the acoustic transducer can comprise one or more resistors adapted to provide a varying resistance output in response to changes in incident pressure. In a still further embodiment, the acoustic transducer can comprise one or more inductors adapted to provide a varying inductance output in response to changes in incident pressure. In a still further embodiment, the acoustic transducer includes a combination of capacitors, resistors or inductors to provide an output that varies in response to changes in incident pressure. The varying outputs of the previously described acoustic transducers can be adapted to modulate the oscillation of a modulator and so provide a quantitative measurement of variations in incident pressure.

In a still further embodiment, the acoustic transducer can comprise a fiber optic transducer as is known in the art. Such hydrophones typically rely upon measuring changes in the behaviour of the light passed through a fiber optic guide due to acoustic waves being incident on the hydrophone. As an example only of one type of fiber optic hydrophone that can be used in the present invention, the fiber optic transducer can include an optical reflector that can undergo a displacement that is responsive to acoustic waves. A beam of light from a light source that is carried by a first group of fiber optic guides can be incident on the reflector. The light reflected from the reflector can be carried by a second group of fiber optic guides to a light detector. Any displacement of the reflector due to pressure waves impinging on the reflector are detected by changes in intensity of the reflected light from the light source.

In an alternative example of a fiber optic hydrophone, the hydrophone can include a first fiber optic acoustic wave detector which is subjected to incident acoustical waves. A similar fiber optic is also provided in the hydrophone in an acoustically isolated compartment where the optic fiber is not affected by the incident acoustical waves. A comparison of the light passing through each fiber optic can be used to determine the presence and magnitude of the incident acoustical wave on the hydrophone.

In a preferred embodiment, each hydrodynamic housing preferably encloses two acoustic transducers. A majority of the combined length of the two transducers is preferably positioned forward of the middle of each housing to minimise noise from turbulent boundary layer flow. The acoustic transducers are preferably arranged to be mounted around a cable. The transducers are preferably mounted symmetrically around the cable. The hydrophone array can be used as a towed, vertical or seismic downhole array. It is particularly suited to a towed sensor arrangement, where the cable is towed behind a geophysical surveying vessel. The cable could also be adapted to be laid on the sea-bed rather than towed behind a vessel in use as described above.

In another embodiment, each acoustic transducer can include:

a tube comprised at least in part of piezoelectric material and having an inner and outer surface;

a first shell member, having a first edge and a second edge, disposed outside the tube and extending longitudinally of the tube, the first and second edges being connected to or bearing against the outer surface of the tube; and a second shell member, having a first and second edge disposed inside the tube and extending longitudinally of the tube, the first and second edges being connected to or bearing against the inside of the tube.

In this embodiment, the first and second shell members can extend the full longitudinal length of the tube and also preferably encase the outer and inner surfaces of the tube. Each transducer, in this embodiment, preferably has a shape which when viewed in perspective is substantially toroidal. The first and second shell members call be fabricated from a metal, such as an aluminium or bronze alloy to facilitate electrical connection. When each transducer, as described in this embodiment, is used as a receiver, the acoustic signal impinges as a pressure wave on the shell members causing the shell members to flex inwardly and outwardly in response to the signal. The inward and outward flexing of the shell members acts as a stress amplifier and leads to a corresponding amplification in the change in the longitudinal extension of the piezoelectric tube which in turn produces a corresponding electric signal.

In the case of an array that will be towed by a vessel, the cable in such an application must provide towing forces for the acoustic transducers and desirably the electrical and other signal connections necessary between each acoustic transducer and the associated data processing and analysis equipment which is normally located in the vessel towing the array. Signal transmission through the cable may be through standard bearers or through the use of optical fibers.

When mounted on a cable, a strain shielding element is preferably provided on the cable for each acoustic transducer. The shielding element serves to shield the transducer from stresses generated in the cable. The shielding element preferably consists in a cylindrical member that fits snugly around the cable. In one embodiment, the shielding element can be sectioned longitudinally into longitudinal segments. The cylindrical member is preferably fabricated from a stiff material such as a metal, alloy or carbon fiber.

The acoustic transducers within each housing are separated by a short distance. This distance can be filled with a relatively soft material, such as a polyurethane composite. In the volume extending forwardly from the front acoustic transducer, the housing can be substantially filled with a relatively hard syntactic composite material. In the volume extending rearwardly from the rear-most transducer, the housing can be filled with a relatively soft syntactic composite material. The syntactic composite materials in the housing serve to provide the housing with a degree of buoyancy which is particularly useful when the array is being used as a towed array.

In one embodiment, each housing is preferably hydrodynamically smoothly shaped. Each housing in this embodiment can have a nose section comprising a smoothly increasing cross-sectional diameter from a point of attachment to the cable to a point of maximum cross-sectional diameter. The housing can also smoothly decrease in cross-sectional diameter from the point of maximum cross-sectional diameter to a point of attachment to a tail bridle that defines a tail section of the housing. The point of maximum cross-section diameter is preferably located in this embodiment closer to the tail bridle attachment than to the point of attachment to the towing cable. The housing in this embodiment can be circular in cross-sectional diameter. Further, the housing, when viewed in length-wise cross-section, can define a curve that is everywhere continuously second order differential. The housing can be formed from a material having varying flexural rigidity, with the housing being more flexible in the tail section thereof than in the nose section thereof. Where the array comprises a plurality of housings as described in this paragraph, the distance between the respective housings can be generally equal to one half wave length at the highest frequency of interest. Alternatively, the housings may be randomly or logarithmically spaced such that the nearest distance between two housings is greater than one housing length.

In another embodiment, the cable and plurality of housings can be enclosed within an outer sheath of substantially constant external dimensions which extends substantially the full length of the cable. The sheath can be comprised of a plastics material and provide a water-tight enclosure for the cable and housings. The sheath can be formed from a relatively soft and relatively smooth material, such as thermoplastic rubber or polyurethane. In another embodiment, the sheath can be formed from a non-watertight material. The sheath can be filled with a gel, fluid, or plastics material. In this embodiment, the sheath can be cylindrical or elliptical in cross-section.

In a further embodiment, the housing can have a first bend limiting means extending forwardly from its nose section. The housing in a still further embodiment can have a second bend limiting means extending rearwardly from its tail section. In one embodiment, the first and/or second bend limiting means can at least partially overlap with the housing. Where there is an overlap with the housing, the thickness of the bend limiting means can also decrease along the housing. The first bend limiting means can taper in thickness away from the nose section. The second bend limiting means can also taper in thickness away from the tail section. The first and second bend limiting means are respectively adapted to minimise the degree of bending of the array proximate the housing. While some bending of the array can occur while the array is deployed, tight bending of the cable can lead to damage to the cable and housing when the cable is in a rolled configuration. By minimising the degree of curvature, the bend limiting means reduce the likelihood of the array being rolled up to a degree that damages the array.

The first and second bend limiting means can be formed from a polyurethane or polyurethane composite material. The respective bend limiting means can have a Shore A 60–70 hardness.

The towing cable is preferably comprised of a plurality of aramid fibres. The aramid fibres can be coated with a paraffin wax compound or similar to prevent water ingress into the aramid fibres. The towing cable is preferably surrounded by a plurality of data bearers that extend between each of the housings and the associated data processing and analysis equipment. The data bearers can be jacketed with a plastics material, such as polyethylene. Such a lightweight, low density and slippery plastics material jacket serves to lower the density of the entire array and allows the data bearers to withstand a greater number of bending cycles.

The hydrophone array can include at least one velocity sensor and/or accelerometer. These sensors can be mounted in each housing of the array. The sensors can be mounted, in one embodiment, between the inner surface of the support structure and the outer surface of the strain shielding element. The sensors are preferably adapted to allow determination and monitoring of the different components of motion of the housings included in the array.

The signals generated by the at least two acoustic transducers in the array are preferably amplified in a preamplifier circuit. Such a transducer/preamplifier combination can include a calibration signal input that injects a calibration signal through the transducers, preamplifiers, and other signal conditioning electronics permitting amplitude and phase differences between channels to be removed in later digital or analog processing. In a preferred embodiment, the calibration signal is injected differentially into a differential pair of transducers. Such a result may be achieved by putting a resistor between each piezoelectric transducer of a differential pair and ground, and injecting the calibration signal at the resistor-transducer junctions. The signals can also be passed through signal conditioning electronics. Such signal conditioning electronics can include multiple pole low cut filtering before any digitisation process is applied to preserve maximum dynamic range in the presence of very low frequency noise sources such as ocean swells.

According to a further aspect, the present invention comprises a hydrophone array including a cable having attached thereto a plurality of hydrodynamically shaped housings, each housing enclosing at least one acoustic transducer, said transducer comprising one or more capacitors which undergo a change in capacitance that is proportional to changes in incident pressure on said housing.

According to yet a further aspect, the present invention comprises a hydrophone array including a cable having attached thereto a plurality of hydrodynamically shaped housings, each housing enclosing at least one acoustic transducer, said acoustic transducer comprising one or more resistors which provide a varying resistance output in response to changes in incident pressure on said housing.

According to a still further aspect, the present invention comprises a hydrophone array including a cable having attached thereto a plurality of hydrodynamically shaped housings, each housing enclosing at least one acoustic transducer, said acoustic transducer comprising one or more inductors which provide a varying inductance output in response to changes in incident pressure on said housing.

According to a further aspect, the present invention comprises a hydrophone array including a cable having attached thereto a plurality of hydrodynamically shaped housings, each housing enclosing at least one acoustic transducer, said acoustic transducer comprising a combination of capacitors, resistors or inductors which provide an output that varies in response to changes in incident pressure on said housing.

According to yet a further aspect, the present invention comprises a hydrophone array including a cable having attached thereto a plurality of hydrodynamically shaped housings, each housing enclosing at least one acoustic transducer, said acoustic transducers comprising a fiber optic transducer.

According to a still further aspect, the present invention comprises a hydrophone array including a cable having attached thereto a plurality of housings, the housings being enclosed within an outer sheath of substantially constant external dimensions which extends substantially the full length of the array, each housing enclosing at least one acoustic transducer, said transducer comprising one or more capacitors which undergo a change in capacitance that is proportional to changes in incident pressure on said housing.

According to a further aspect, the present invention comprises a hydrophone array including a cable having attached thereto a plurality of housings, the housings being enclosed within an outer sheath of substantially constant external dimensions which extends substantially the full length of the array, each housing enclosing at least one acoustic transducer, said acoustic transducer comprising one or more resistors which provide a varying resistance output in response to changes in incident pressure on said housing.

According to yet a further aspect, the present invention comprises a hydrophone array including a cable having attached thereto a plurality of housings, the housings being enclosed within an outer sheath of substantially constant external dimensions which extends substantially the full length of the array, each housing enclosing at least one acoustic transducer, said acoustic transducer comprising one or more inductors which provide a varying inductance output in response to changes in incident pressure on said housing.

According to a still further aspect, the present invention comprises a hydrophone array including a cable having attached thereto a plurality of housings, the housings being enclosed within an outer sheath of substantially constant external dimensions which extends substantially the full length of the array, each housing enclosing at least one acoustic transducer, said acoustic transducer comprising a combination of capacitors, resistors or inductors which provide an output that varies in response to changes in incident pressure on said housing.

According to a further aspect, the present invention comprises a hydrophone array including a cable having attached thereto a plurality of housings, the housings being enclosed within an outer sheath of substantially constant external dimensions which extends substantially the full length of the array, each housing enclosing at least one acoustic transducer, said acoustic transducers comprising a fiber optic transducer.

According to yet a further aspect, the present invention comprises a hydrophone array including a cable having attached thereto a plurality of hydrodynamically shaped housings, each housing enclosing at least one acoustic transducer, the housing having a volume between the cable and the transducer that is substantially filled with syntactic composite material.

According to a still further aspect, the present invention comprises a hydrophone array including a cable having attached thereto a plurality of hydrodynamically shaped housings, each housing enclosing at least one acoustic transducer, the housing having a volume extending forwardly from the forwardmost of said at least one acoustic transducer in said housing, said volume being substantially filled with a syntactic composite material.

According to a further aspect, the present invention comprises a hydrophone array including a cable having attached thereto a plurality of hydrodynamically shaped housings, each housing enclosing at least one acoustic transducer, the housing having a volume extending rearwardly from the rearmost of said at least one acoustic transducer in said housing, said volume being filled with a syntactic composite material.

According to yet a further aspect, the present invention comprises a hydrophone array including a cable having attached thereto a plurality of hydrodynamically shaped housings, each housing enclosing at least one acoustic transducer, the housing having a first volume extending forwardly from the forwardmost of said at least one acoustic transducer in said housing, said first volume being substantially filled with a relatively hard syntactic composite material, and a second volume extending rearwardly from the rearmost of said at least one acoustic transducer in the housing, said second volume being filled with a relatively soft syntactic composite material.

According to a still further aspect, the present invention comprises a hydrophone array including a cable having attached thereto a plurality of housings, the housings being enclosed within an outer sheath of substantially constant external dimensions which extends substantially the full length of the array, each housing enclosing at least one acoustic transducer, the housing having a volume between the cable and the transducer that is substantially filled with syntactic composite material.

According to a further aspect, the present invention comprises a hydrophone array including a cable having attached thereto a plurality of housings, the housings being enclosed within an outer sheath of substantially constant external dimensions which extends substantially the full length of the array, each housing enclosing at least one acoustic transducer, the housing having a volume extending forwardly from the forwardmost of said at least one acoustic transducer in said housing, said volume being substantially filled with a syntactic composite material.

According to yet a further aspect, the present invention comprises a hydrophone array including a cable having attached thereto a plurality of housings, the housings being enclosed within an outer sheath of substantially constant external dimensions which extends substantially the full length of the array, each housing enclosing at least one acoustic transducer, the housing having a volume extending rearwardly from the rearmost of said at least one acoustic transducer in the housing, said volume being filled with a syntactic composite material.

According to a still further aspect, the present invention comprises a hydrophone array including a cable having attached thereto a plurality of housings, the housings being enclosed within an outer sheath of substantially constant external dimensions which extends substantially the full length of the array, each housing enclosing at least one acoustic transducer, the housing having a first volume extending forwardly from the forwardmost of said at least one acoustic transducer in said housing, said first volume being substantially filled with a relatively hard syntactic composite material, and a second volume extending rearwardly from the rearmost of said at least one acoustic transducer in the housing, said second volume being filled with a relatively soft syntactic composite material.

According to a further aspect, the present invention comprises a hydrophone array including a cable having attached thereto a plurality of hydrodynamically shaped housings, each housing enclosing at least one acoustic transducer and having a first bend limiting means extending forwardly from a nose section thereof and a second bend limiting means extending rearwardly from a tail section thereof.

In this aspect, one or both of the first and second bend limiting means can at least partially overlap with the housing. Further, the first bend limiting means can taper in thickness away from said nose section and said second bend limiting means can taper in thickness away from said tail section.

According to yet a further aspect, the present invention comprises a hydrophone array including a cable having attached thereto a plurality of hydrodynamically shaped housings, each housing enclosing at least one acoustic transducer and at least one velocity sensor.

According to a still further aspect, the present invention comprises a hydrophone array including a cable having attached thereto a plurality of hydrodynamically shaped housings, each housing enclosing at least one acoustic transducer and at least one accelerometer sensor.

According to a further aspect, the present invention comprises a hydrophone array including a cable having attached thereto a plurality of housings, the housings being enclosed within an outer sheath of substantially constant external dimensions which extends substantially the full length of the array, each housing enclosing at least one acoustic transducer and at least one velocity sensor.

According to yet a further aspect, the present invention comprises a hydrophone array including a cable having attached thereto a plurality of housings, the housings being enclosed within an outer sheath of substantially constant external dimensions which extends substantially the full length of the array, each housing enclosing at least one acoustic transducer and at least one accelerometer sensor.

BRIEF DESCRIPTION OF THE DRAWINGS

By way of example only, a preferred embodiment of the invention is now described with reference to the accompanying drawings, in which.

PREFERRED MODE OF CARRYING OUT THE INVENTION

Figure 1:
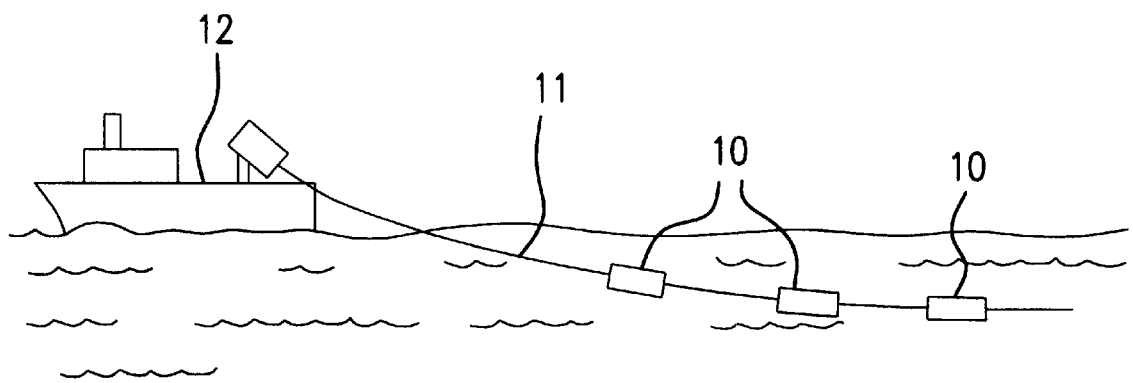
FIG. 1 is an illustrative depiction (not to scale) of a towed array of acoustic transducers according to the present invention.

A towed hydrophone array for use in seabed seismic exploration is depicted in FIG. 1. The towed array includes a cable 11 having an array of housings 10 enclosing in each case two acoustic transducers periodically spaced along the cable 11. The cable is extended from the stern of a surveying vessel 12 that is adapted to tow the array. Such arrays typically extend several hundred meters to a few kilometers beyond the stern of the vessel 12. The placement of the housings 10 along the cable 11 can be periodic, logarithmic or random.

While the invention is depicted as a towed array, it will be appreciated that the acoustic transducers defined in the present application have a wider application. For example, the housings can be used in vertical or seismic downhole arrays. The cable 11 rather than being towed behind a moving vessel 12 could also instead be adapted to be laid on the seabed when being used.

Figure 2:
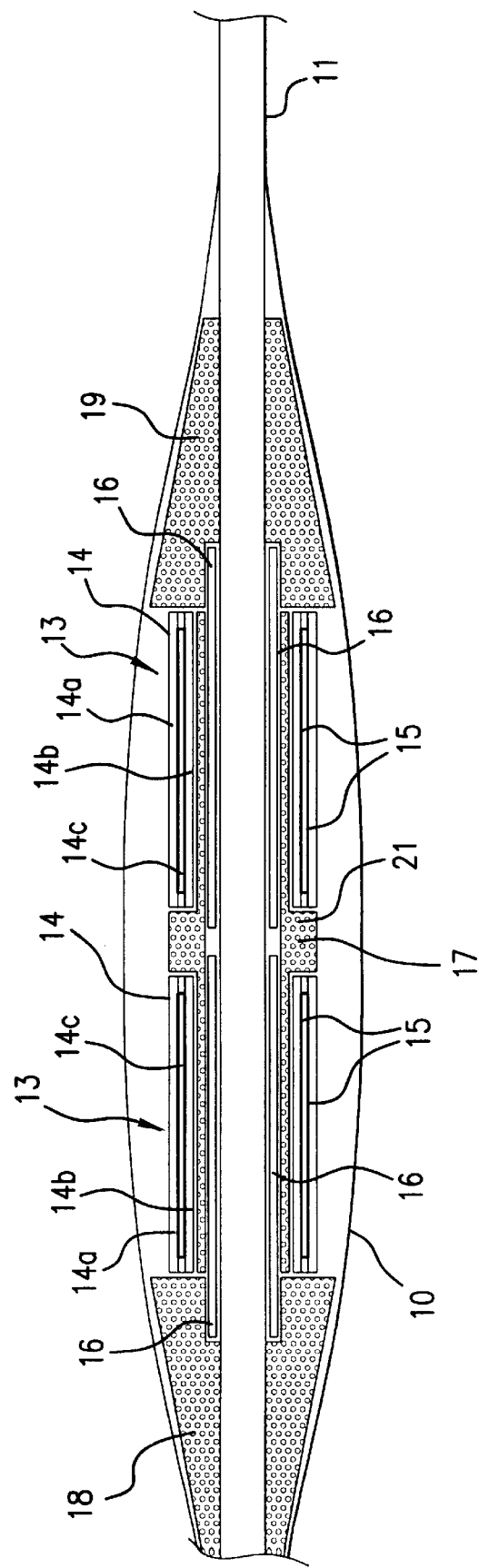
FIG. 2 is a cross-sectional view of one embodiment of a housing enclosing at least two acoustic transducers according to the present invention.
Figure 3A:
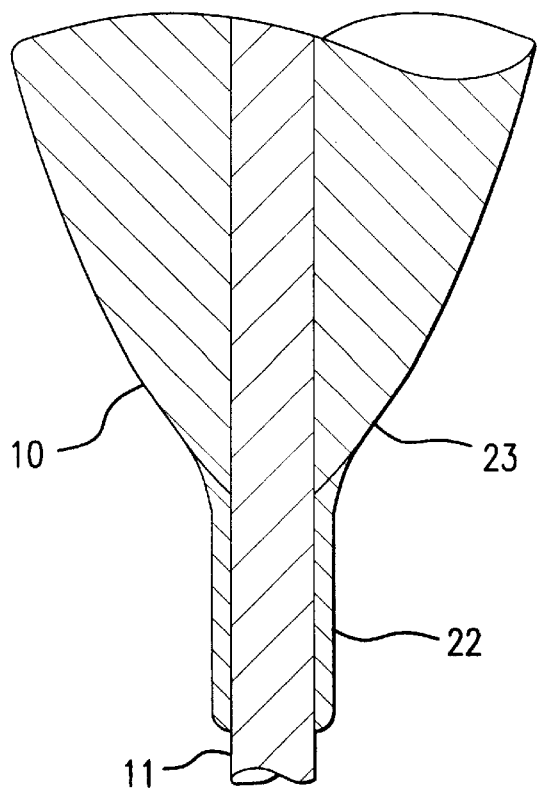
FIG. 3a is a cross-sectional view of a bend limiting means at the nose section of a hydrophone housing and FIG. 3b is a cross-sectional view of a bend limiting means at the tail section of a hydrophone housing.
Figure 3B:
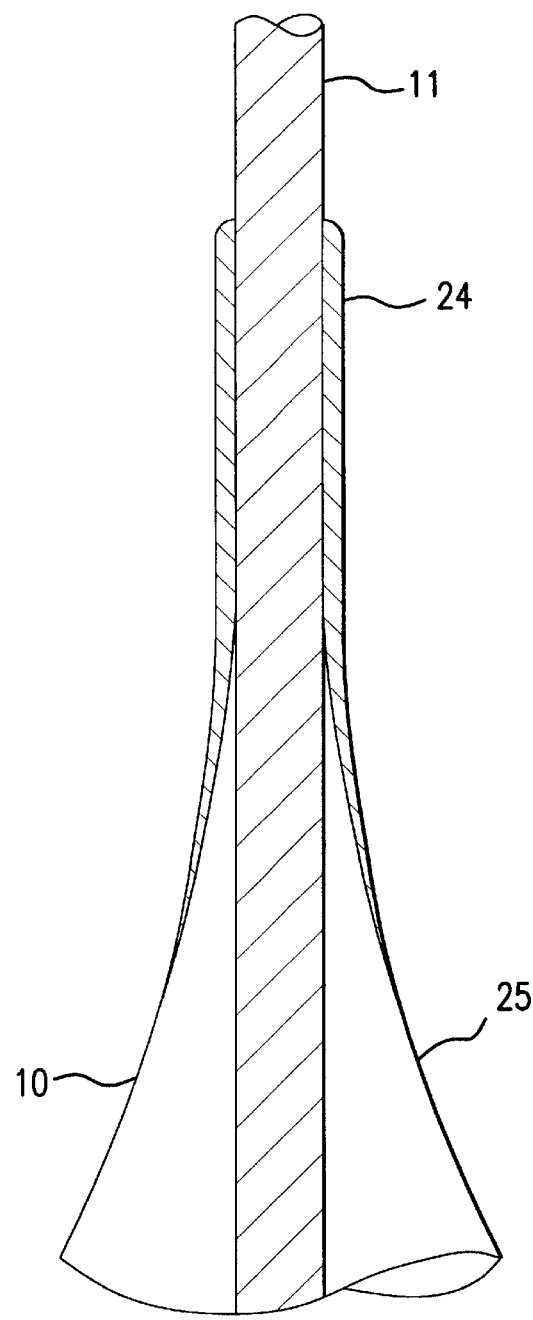

Each housing 10 can have a cross-sectional shape as is depicted in FIG. 2. Each housing is hydrodynamically smoothly shaped in the direction of flow of the array through the sea. As depicted in FIGS. 3a and 3b, the housing 10 can also have a first bend limiter 22 extending forwardly about the cable 11 from the nose section 23 of the housing 10 and a second bend limiter 24 extending rearwardly about the cable 11 from the tail section 25 of the housing 10. The bend limiters 22,24 are formed from Shore A hardness 60–70 polyurethane and serve to minimise bending of the cable 11 proximate the location of each housing 10 on the cable 11. By minimising bending, the potential for damage to the housing 10 and cable 11 while the array is in use or in rolled storage is reduced. The bend limiters 22,24 can decrease in thickness away from the housing 10 if desired. The polyurethane forming the bend limiters can also overlap with a portion of the housing 10 such as depicted in FIG. 3b. By overlapping the polyurethane with the housing 10, the adhesion between the housing 10 and the bend limiter 24 is increased.

In an embodiment not depicted in the drawings, the housings 10 and cable 11 can be enclosed within an outer sheath of substantially constant external dimensions and which extends substantially the full length of the cable 11. The sheath can be comprised of a water-tight plastics material and so provide a water-tight enclosure for the cable 11 and housings 10. In another embodiment, if preferred, the hydrodynamic sheath could be non-watertight. The sheath will normally be either cylindrical or elliptical in cross-section and be filled with a gel, fluid or suitable plastics material that substantially fills the space between the cable 11 and housings 10 and the inner surface of the outer wall of the sheath.

The towing cable in the depicted embodiment is comprised of a plurality of aramid fibres coated with a paraffin wax compound to help prevent water ingress into the aramid fibres. The aramid fibres comprising the towing cable 11 are surrounded by a plurality of data bearers that extend between the housings of the enclosed acoustic transducers and the associated data processing and analysis equipment that is operated on the vessel 12. In this embodiment, the data bearers are coated with a coat of polyethylene which serves to lower the effective density of the array and also provides the data bearers with a capability of withstanding a greater number of bending cycles than would otherwise be the case.

Each housing 10 of the array in the depicted embodiment has two piezoelectric acoustic transducers 13, with the majority of the combined length being positioned forwardly of the middle of each housing 10. While piezoelectric transducers are used in the depicted embodiment, other suitable acoustic transducers could be used in the present invention as will be understood by persons skilled in the art. Where the transducer comprises a one or more capacitors, one or more resistors and/or one or more inductors, the housing can enclose just one acoustic transducer.

The acoustic transducers are mounted symmetrically around the cable 11 and incorporate a tubular polycarbonate support structure 14. In the depicted embodiment, the support structure 14 comprises concentric outer and inner tubes 14a,14b defining a space 14c therebetween. The inner surface of the outer tube 14a and the outer surface of the inner tube 14b are bonded to a thin wrap of piezoelectric polyvinylidene fluoride (PVDF) film 15. Where more than one wrap of PVDF film is utilised, the individual wraps can be coated with mylar or other suitable insulating plastics material to ensure the metal electrodes on the faces of the respective wraps of PVDF do not come into contact with each other. The metal electrodes of the PVDF film can be formed from a suitable electrically conducting metal, such as silver, gold or aluminum. Electrical connection to the electrodes of the PVDF film is provided by electrically conductive leads which are attached to the electrodes using a conductive epoxy or adhesive metallic tape.

The outer surface of the outer tube 14b can also be coated with a metallic coating. In the depicted embodiment, the metallic coating is formed from a metallic spray paint, which in turn is connected to an electrically conductive shield or drain wire (not depicted).

Disposed around the cable 11 and within the tubular support structure 14 is a strain shielding element 16 formed from stiff carbon fibre composite. The shielding element 16 fits snugly around the cable 11 and serves to shield the piezoelectric acoustic transducers 13 from stresses generated in the cable 11 during its use.

In the volume 18 extending forwardly of the front piezoelectric acoustic transducer 13, the housing 10 is filled with a relatively hard syntactic composite material. In the volume 19 extending rearward of the back acoustic transducer, the housing 10 is filled with a relatively soft syntactic composite material. The syntactic composite materials in the volumes 18,19 provide the housing 10 with improved buoyancy. Where syntactic composite material is used in the housings to improve buoyancy, the housing can enclose a single acoustic transducer rather than the two as described above. In the depicted embodiment, the respective piezoelectric acoustic transducers 13 are separated by a short gap 17 that is filled with a different syntactic material to that used in volumes 18,19. The syntactic material in the gaps 17 can be a polyurethane composite or polyurethane. The syntactic material in the gaps 17 can also fill the annular region between the shielding element 16 and the support structure 14.

Electronics for providing preliminary processing of the signals received by the piezoelectric acoustic transducers 13 can be positioned in the housing in the region generally depicted as 21 in FIG. 2. In this region, the housing 10 can also be provided, if desired, with suitable velocity sensors and/or accelerometers to provide signals providing information on the different components of motion of the housing 10 in the array.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A hydrophone array, comprising:

a cable; and housings attached to said cable along a length thereof, at least one of the housings enclosing at least two acoustic transducers successively positioned in an axial direction of said housing which runs co-directionally with said cable, each of said at least two acoustic transducers having an independent output providing a discrete signal utilizable independently of another of said at least two acoustic transducers, each of said at least two acoustic transducers being able, in use, to sense a same tensor component of an elastic wave in a medium surrounding the hydrophone array.

2. The hydrophone array of claim 1 wherein said acoustic transducers comprise a tube formed at least in part of piezoelectric material.

3. The hydrophone array of claim 2 wherein said piezoelectric material is one of an active polarized barium titanate and lead zirconate titanate (PZT) ceramic material.

4. The hydrophone array of claim 2 wherein said piezoelectric material is a piezoelectric polymer material.

5. The hydrophone array of claim 4 wherein said piezoelectric polymer material is polyvinylidene fluoride (PVDF).

6. The hydrophone array of claim 2 wherein said tube is sectioned longitudinally into longitudinal segments, an inner and outer face of the said segments each having an electrically conductive electrode.

7. The hydrophone array of claim 4 wherein said piezoelectric polymer film is bonded to a tubular support structure.

8. The hydrophone array of claim 7 wherein said support structure comprises at least an inner tube and an outer tube, said inner and outer tubes sharing a common longitudinal axis and having an annular space located therebetween that extends at least a substantial length of said tubular structure.

9. The hydrophone array of claim 8 wherein said piezoelectric polymer film is bonded to an inner surface of said outer tube.

10. The hydrophone array of claim 7 wherein said support structure is fabricated from polycarbonate.

11. The hydrophone array of claim 1 wherein said acoustic transducers comprise one or more capacitors which undergo a change in capacitance that is proportional to changes in incident pressure on said housings.

12. The hydrophone array of claim 1 wherein said acoustic transducers comprise one or more resistors which provide a varying resistance output in response to changes in incident pressure on said housings.

13. The hydrophone array of claim 1 wherein said acoustic transducers comprise one or more inductors which provide a varying inductance output in response to changes in incident pressure on said housings.

14. The hydrophone array of claim 1 wherein said acoustic transducers comprise a combination of capacitors, resistors or inductors which provide an output that varies in response to changes in incident pressure on said housings.

15. The hydrophone array of claim 1 wherein said acoustic transducers comprise a fiber optic transducer.

16. The hydrophone array of claim 1 wherein said at least one of said housings encloses two acoustic transducers, including a front transducer and a rear transducer.

17. The hydrophone array of claim 16 wherein a majority of the combined length of the front and rear transducers is positioned forward of the middle of said at least one of said housings to minimize noise from turbulent boundary layer flow.

18. The hydrophone array of claim 17 wherein said two acoustic transducers are mounted around a towing cable.

19. The hydrophone array of claim 18 wherein a stain shielding element is fitted around said cable between said cable and each of said acoustic transducers.

20. The hydrophone array of claim 16 wherein the front and rear acoustic transducers within said at least one of said housings are separated by a distance, said distance being filled with a relatively soft material.

21. The hydrophone array of claim 20 wherein said relatively soft material is a polyurethane composite.

22. The hydrophone array of claim 16 wherein a volume between the cable and the transducer is substantially filled with syntactic composite material.

23. The hydrophone array of claim 16 wherein a volume extending forwardly from the front acoustic transducer in said housing is substantially filled with a syntactic composite material.

24. The hydrophone array of claim 16 wherein a volume extending rearwardly from the rear transducer in the housing is filled with a syntactic composite material.

25. The hydrophone array of claim 16 wherein a volume extending forwardly from the front acoustic transducer in said housing is substantially filled with a relatively hard syntactic composite material, and a volume extending rearwardly from the rear transducer in the housing is filled with a relatively soft syntactic composite material.

26. The hydrophone array of claim 1 wherein said at least one of said housings is hydrodynamically smoothly shaped.

27. The hydrophone array of claim 1 wherein said plurality of housings is enclosed within an outer sheath of substantially constant external dimensions which extends substantially the full length of the array.

28. The hydrophone array of claim 1 wherein said at least one of said housings has a first band limiting means extending forwardly from a nose section thereof and a second bend limiting means extending rearwardly from a tail section thereof.

29. The hydrophone array of claim 28 wherein one or both of the first and second bend limiting means at least partially overlap with the housing.

30. The hydrophone array of claim 28 wherein said first bend limiting means tapers in thickness away from said nose section and said second bend limiting means tapers in thickness away from said tail section.

31. The hydrophone array of claim 1 wherein said at least one of said housings has at least one velocity sensor.

32. The hydrophone array of claim 1 wherein said at least one of said housings has at least one accelerometer sensor.

33. The hydrophone array of claim 1 wherein signals generated by the at least two acoustic transducers in said at least one of said housings of said array are amplified in a preamplifier circuit, each circuit further comprising a calibration signal input that allows injection of a calibration signal input through the transducers and prepamplifier circuits permitting amplitude and phase differences between channels to be removed in later digital or analog processing of the signals.

34. The hydrophone array of claim 33 wherein said calibration signal is injected differentially into a differential pair of transducers.

35. The hydrophone array of claim 1, wherein said at least two acoustic transducers are arranged in said housing so as to be symmetrically mounted about said cable.

36. The hydrophone array of claim 1, wherein said at least two acoustic transducers each includes a tubular polycarbonate support structure.

37. A hydrophone array, comprising:

a cable; and housings attached to said cable along a length thereof, at least one of said housings having a hydrodynamic shape and enclosing at least one acoustic transducer, said at least one of said housings having a volume extending forwardly from a forwardmost of said at least one acoustic transducer in said housing, at least portion of said volume which is forward of said at least one acoustic transducer extending radially to at least a radial position of said at least one acoustic transducer, said volume being substantially filled with a syntactic composite material.

38. A hydrophone array, comprising:

a cable; and housings attached to said cable along a length thereof, at least one of said housings having a hydrodynamic shape and enclosing at least one acoustic transducer, said at least one of said housings having a volume extending rearwardly from the rearmost of said at least one acoustic transducer in said housing, at least a portion of said volume which is rearward of said at least one acoustic transducer extending radially to at least a radial position of said at least one acoustic transducer, said volume being filled with a syntactic composite material.

39. A hydrophone array, comprising:

a cable having attached thereto a plurality of hydrodynamically shaped housings, each of said housings enclosing at least one acoustic transducer, each of said housings having a first volume extending forwardly from a forwardmost of said at least one acoustic transducer in said housing, said first volume being substantially filled with a first syntactic composite material, and a second volume extending rearwardly from the rearmost of said at least one acoustic transducer in the housing, said second volume being filled with a second syntactic composite material, said first syntactic composite being relatively harder than said second syntactic composite material.

40. A hydrophone array, comprising:

a cable having attached thereto a plurality of housings, the housings being enclosed within an outer sheath of substantially constant external dimensions which extends substantially the full length of the array, each housing enclosing at least one acoustic transducer, the housing having a first volume extending forwardly from a forwardmost of said at least one acoustic transducer in said housing, said first volume being substantially filled with a first syntactic composite material, and a second volume extending rearwardly from the rearmost of said at least one acoustic transducer in the housing, said second volume being filled with a second syntactic composite material, said first syntactic composite being relatively harder than said second syntactic composite material.

41. A hydrophone array, comprising:

a cable; and housings attached to said cable along a length thereof, at least one of said housings having a hydrodynamic shape and enclosing at least one acoustic transducer, said at least one of said housings having a first bend limiting means extending forwardly from a nose section thereof and a second bend limiting means extending rearwardly from a tail section thereof, an axis of said at least one housing arranged co-directionally with the cable extending between the nose section and the tail section, a portion of at least one of said first and second bend limiting means coaxially overlapping an exterior portion of the housing extending from a respective at least one of said nose section and said tail section.

42. The hydrophone array of claim 41 wherein said first bend limiting means tapers in thickness away from said nose section and said second bend limiting means tapers in thickness away from said tail section.

43. A hydrophone array, comprising:

a cable; and housings attached to said cable along a length thereof, at least one of said housings having a hydrodynamic shape and enclosing at least one acoustic transducer, said at least one of said housings having a first volume extending forwardly from a forwardmost of said at least one acoustic transducer in said housing, said first volume being substantially filled with a first syntactic composite material, and a second volume extending rearwardly from the rearmost of said at least one acoustic transducer in the housing, said second volume being filled with a second syntactic composite material, said first syntactic composite being relatively harder than said second syntactic composite material.

44. The hydrophone array of claim 43, further comprising an outer sheath of substantially constant external dimensions, said outer sheath enclosing said housings and extending substantially a full length of the array.

* * * * *